(12) United States Patent
Schmitz

(10) Patent No.: US 8,031,063 B2
(45) Date of Patent: Oct. 4, 2011

(54) METHOD AND APPARATUS FOR DRIVER ASSISTANCE

(75) Inventor: Carsten Schmitz, Wasserburg (DE)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 10/570,977

(22) PCT Filed: Aug. 25, 2004

(86) PCT No.: PCT/EP2004/051906
§ 371 (c)(1),
(2), (4) Date: Dec. 8, 2006

(87) PCT Pub. No.: WO2005/025918
PCT Pub. Date: Mar. 24, 2005

(65) Prior Publication Data
US 2007/0115105 A1 May 24, 2007

(30) Foreign Application Priority Data
Sep. 12, 2003 (DE) .................. 103 42 528

(51) Int. Cl.
*B60Q 1/00* (2006.01)
(52) U.S. Cl. .................. 340/439; 701/36; 340/576
(58) Field of Classification Search .................. 340/438
See application file for complete search history.

(56) References Cited

U.S. PATENT DOCUMENTS

| 4,213,116 A | * | 7/1980 | Holtzman et al. ............. 340/476 |
| 5,285,523 A | * | 2/1994 | Takahashi ........................ 706/20 |
| 6,107,939 A | * | 8/2000 | Sorden .......................... 340/901 |
| 6,304,811 B1 | * | 10/2001 | Prestl .............................. 701/96 |
| 6,393,361 B1 | * | 5/2002 | Yano et al. ..................... 701/301 |
| 6,556,909 B2 | * | 4/2003 | Matsumoto et al. ............ 701/41 |
| 6,580,973 B2 | * | 6/2003 | Leivian et al. .................... 701/1 |
| 2002/0091479 A1 | * | 7/2002 | Maruko et al. .................. 701/96 |
| 2003/0156015 A1 | * | 8/2003 | Winner et al. ............. 340/425.5 |
| 2004/0158367 A1 | * | 8/2004 | Basu et al. ....................... 701/29 |

FOREIGN PATENT DOCUMENTS

| DE | 101 18 295 | 10/2002 |
| DE | 102 05 225 | 11/2003 |
| EP | 1 074 430 | 2/2001 |
| EP | 1312506 A2 | * 5/2003 |
| JP | 1 1-321 690 | 11/1999 |
| JP | 2000104583 | 4/2000 |
| JP | 2002092794 | 3/2002 |
| JP | 2002154451 | 5/2002 |
| JP | 2002-3331850 | 11/2002 |
| JP | 2003112540 | 4/2003 |

* cited by examiner

*Primary Examiner* — Travis Hunnings
(74) *Attorney, Agent, or Firm* — Kenyon & Kenyon LLP

(57) ABSTRACT

A method and an apparatus for driver assistance, in which a distinction is made, with the aid of operating variables and a classifier, between an intentional and unintentional lane change by the vehicle.

24 Claims, 5 Drawing Sheets

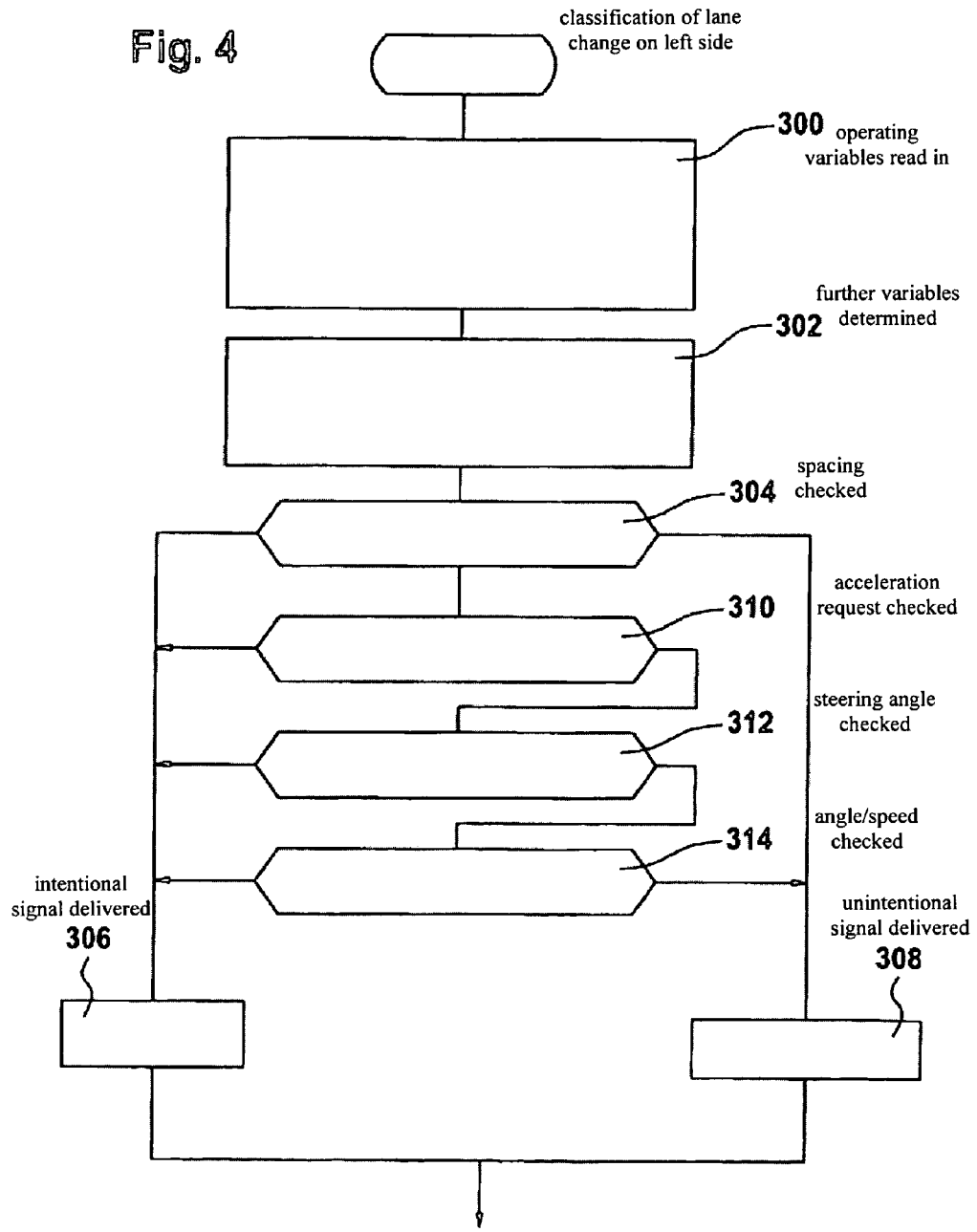

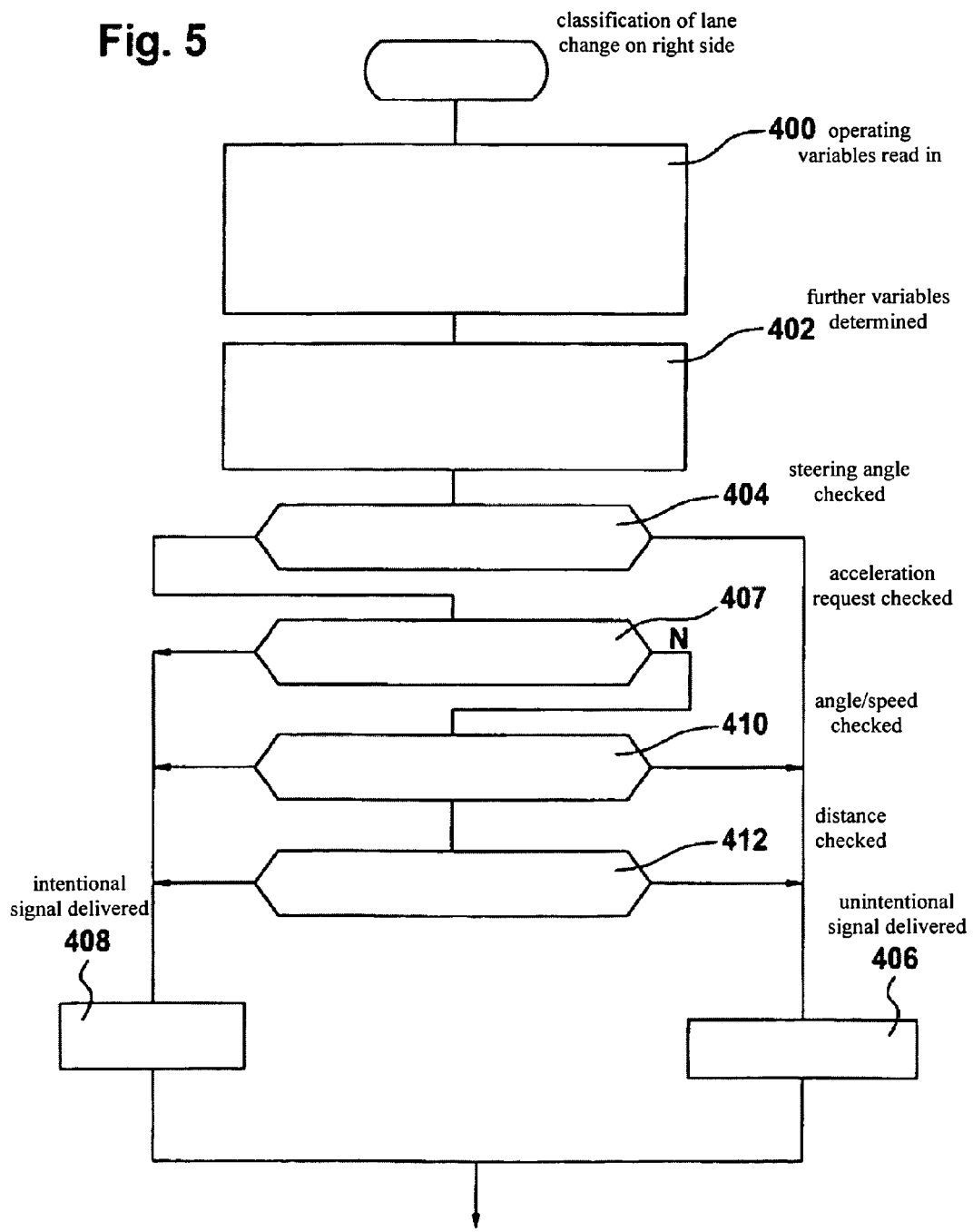

METHOD AND APPARATUS FOR DRIVER ASSISTANCE

BACKGROUND INFORMATION

Methods and apparatuses, called driver assistance systems, are described in the existing art in a variety of manifestations. Examples of such driver assistance systems are adaptive cruise control (ACC) systems, which adapt the vehicle's speed to maintain a separation from a preceding vehicle; lane departure warning systems, which warn the driver upon departure from the lane; systems for monitoring the blind-spot, which warn the driver about objects in the "blind spot" of the driver's field of view when changing lanes, etc. An example of an adaptive cruise control system is shown in German Patent Application No. 101 18 295, and an example of a lane departure warning system in European Patent Application No. 1 074 430. In lane departure warning systems in particular, but also in some ACC embodiments, the system checks whether the vehicle is departing, or about to depart, from the lane delimited, for example, by road edge markings. A considerable functional improvement would be achieved here if a distinction could be made between an intentional and unintentional lane change, i.e. for example between a lane change for passing purposes and a lane change due to inattention by the driver.

SUMMARY OF THE INVENTION

To distinguish whether what is present is a lane change intended by the driver or an unintentional lane change, a classifier that classifies lane change operations on the basis of operating variables of the vehicle is employed. The result, advantageously, is to achieve a considerable reduction in false alarms in the context of a lane departure warning system, since the driver is warned only when the lane change is unintentional, especially when the lane change occurs, or is about to occur, as a result of inattention on the part of the driver.

It is particularly advantageous to use as the classifier a neural network which, based on the operating variables that are delivered, makes a decision as to whether the lane change is intentional or unintentional. This results in a very satisfactory classification accuracy and a further reduction in false alarms.

Particularly reliable distinctions are obtained when the operating variables selected are the steering angle, the vehicle's spacing from the edge of the road, the angle between the edge of the road and the vehicle's track, and/or a variable that represents the driver's acceleration request.

Advantageously, the procedure presented is also used in combination with other driver assistance systems, for example with an adaptive cruise control system in which, in the context of an intentional lane change, deceleration of the vehicle as it approaches a slower object could be suppressed.

It is particularly advantageous to use a classifier that, based on the available operating variables of the vehicle, performs a classification according to defined criteria as to whether the lane is intentional or unintentional.

BRIEF DESCRIPTION OF THE DRAWINGS

FIGS. 4 and 5 are schematic flow charts depicting a second exemplifying embodiment for detecting whether or not a lane change is intentional.

DETAILED DESCRIPTION

Figure 1:
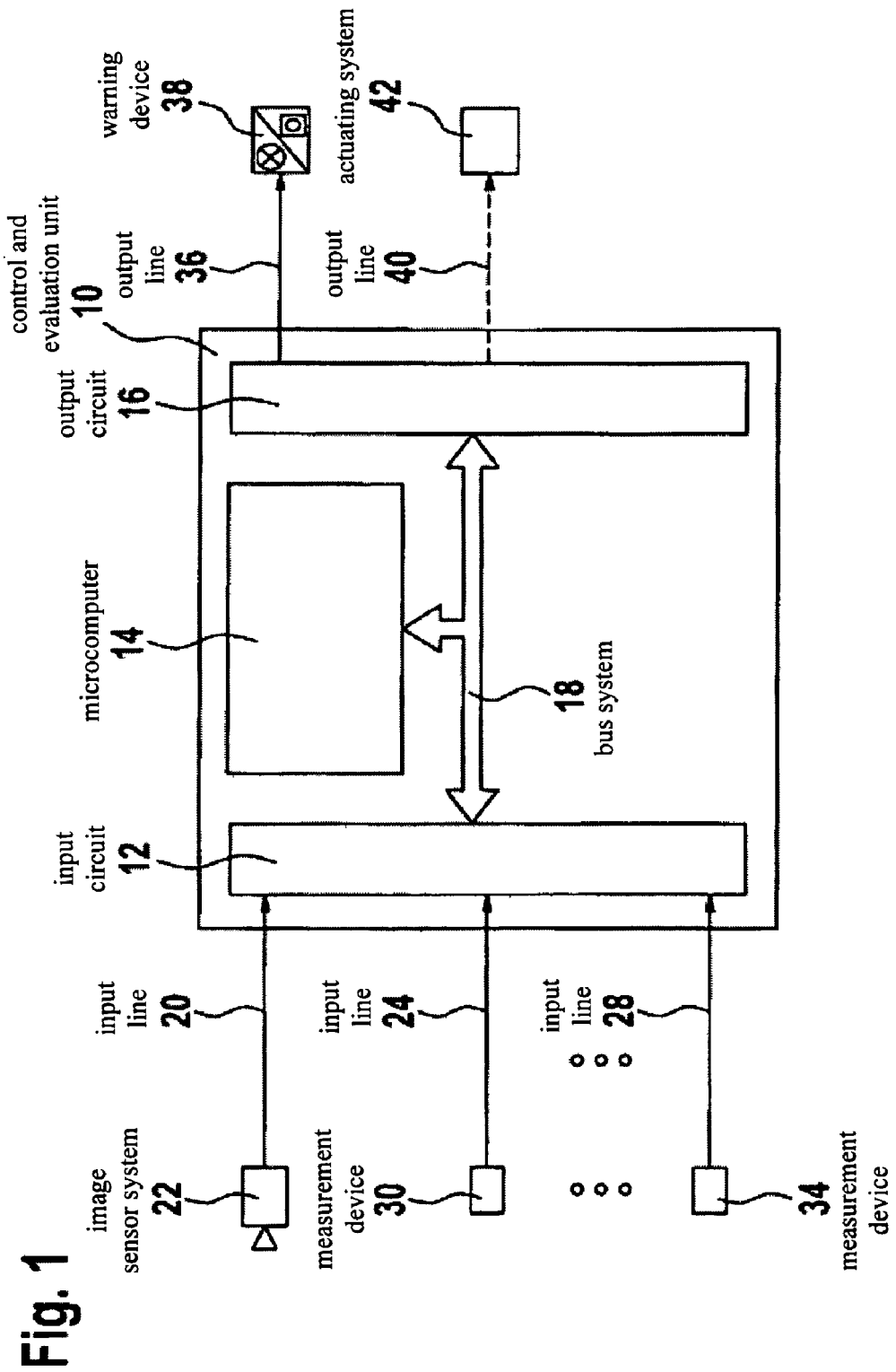
FIG. 1 is a synoptic diagram of a processing unit in which lane change detection is performed, this processing unit being depicted using the example of a lane departure warning system.

FIG. 1 shows an apparatus that is part of a system for driver assistance (e.g. for warning purposes and/or for activation of an actuating element in order to stay within a lane upon departure, or imminent departure, from that lane). The figure depicts a control and evaluation unit 10 that has at least one input circuit 12, a microcomputer 14, and an output circuit 16. These elements are interconnected via a bus system for mutual data interchange. Input circuit 12 has conveyed to it input lines from various measurement devices, through which measurement signals and measurement information are transmitted. A first input line 20 connects input circuit 12 to an image sensor system 22 that images the scene in front of the vehicle. Corresponding image data are transmitted via input line 20. Also provided are input lines 24 through 26 that connect input circuit 12 to measurement devices 30 through 34. These measurement devices are, for example, measurement devices for measuring vehicle speed, for sensing the steering angle, for sensing a variable that represents the driver's acceleration request (e.g. the extent of accelerator pedal actuation by the driver), and for sensing further operating variables of the vehicle that are significant in conjunction with the procedure described below. Via output circuit 16 and output line 36, at least one warning device 38 is triggered, for example a warning lamp, and/or a loudspeaker for an acoustic warning and/or for a voice output, and/or a display for displaying an image, and/or an actuating element for a haptic indicator with which the driver is informed as to (imminent) departure from the lane. Alternatively or in addition thereto, in some exemplifying embodiments provision is made for activating, via output circuit 16 and an output line 40, an actuating system 42 which, for example by acting on the vehicle's steering, automatically returns the vehicle to the lane and thus prevents departure from the lane.

In the exemplifying embodiment of the lane departure warning system, image analysis methods are used to ascertain, on the basis of the image data of the scene in front of the vehicle delivered by the image sensor system, lane data that represent the profile and size of the lane. For example, the lane edge markings (left and/or right lane edge) are sensed, and the profile of the respective lane edge is approximated, for example, as a polynomial (third-order power function). In addition, the profile of the vehicle's track, for example for the right and/or left wheel, is calculated from vehicle geometry variables, current and (if applicable) past vehicle speed variables, the steering angle, or transverse acceleration, etc., and also represented as a polynomial. In one example, a driver warning or a lane-holding reaction is implemented when the two functions (lane marking profile and vehicle track profile) exhibit intersection points in a specific region that corresponds to a specific distance. In the preferred exemplifying embodiment, the warning is issued upon transgression of the left lane marking and upon transgression of the right lane marking. From the aforesaid data, further lane data are calculated, for example the lateral spacing between the lane marking and vehicle track (right side to right edge, left side to left edge), the curvature of the vehicle track, and/or the angle between the vehicle track and lane marking (right vehicle track and right edge, left vehicle track and left edge) on the basis of tangent comparisons.

What is important with regard to such a function is the driver is warned only when he or she does not in fact intend to travel beyond the lane marking.

Figure 2:
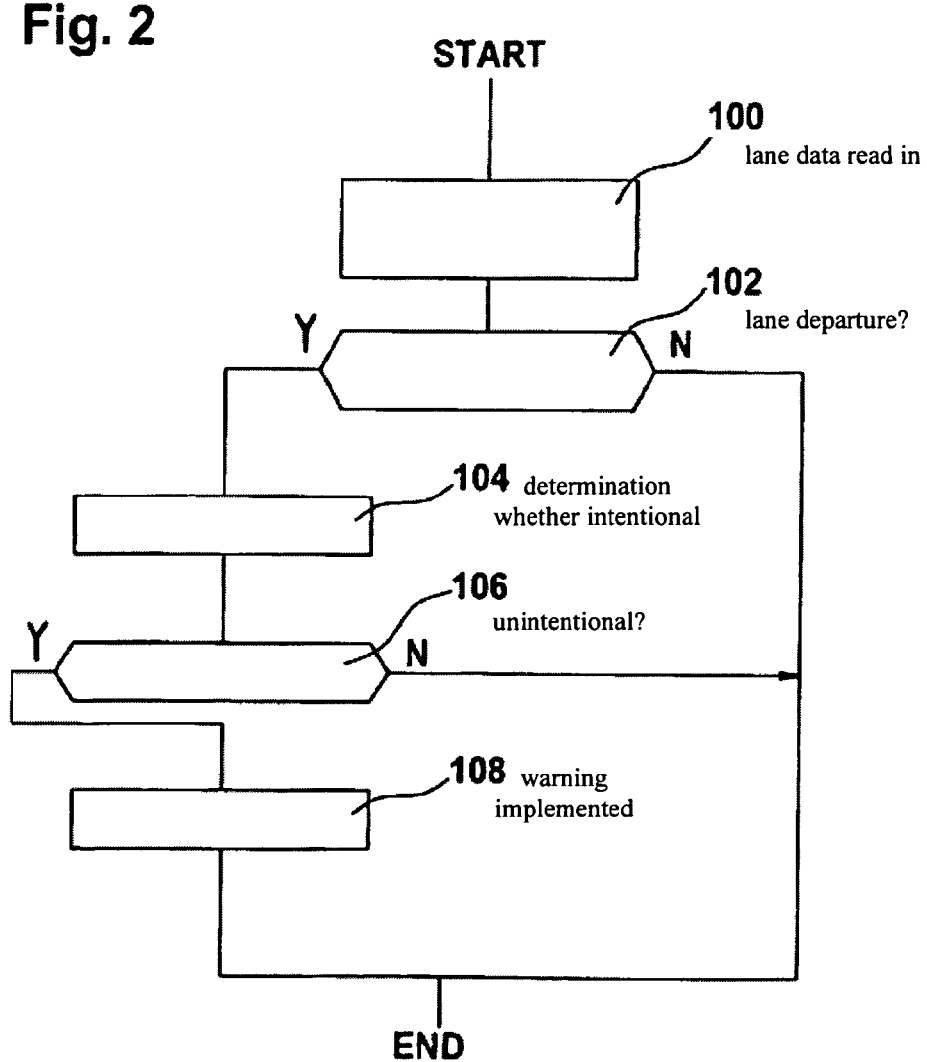
FIG. 2 is a flow chart depicting the basic procedure for lane change classification in conjunction with the lane departure warning system.

FIG. 2 is a flow chart in which the schematic lane departure warning system is supplemented with a classifier that, on the basis of vehicle operating variables, evaluates the lane-change situation and classifies it as an "unintentional lane change" or "intentional lane change." The flow diagram of FIG. 2 sketches a corresponding program that executes in the microcomputer of the apparatus sketched in FIG. 1. In the first step 100, the lane data outlined above are read in (once for one side of the vehicle, and in another pass for the other side of the vehicle), i.e. lane edge marking profile, profile of vehicle's actual track, a variable for the lateral spacing between the vehicle and the lane edge, a variable for the angle between the vehicle track and the lane edge, as well as the further aforementioned operating variables, etc. The subsequent step 102 checks whether a lane departure is present, or whether such a departure is imminent. If not, step 100 is repeated. If a departure or imminent departure is detected, a determination is then made in step 104, by way of the classifier and on the basis of operating variables, as to whether the lane change is intentional or unintentional. Exemplifying embodiments of this classifier are presented below. Step 106 then checks whether or not the lane departure is intentional. If it is intentional, the warning and the lane-holding reaction are omitted and the program repeats with step 100. If it is recognized on the other hand, however, that the lane departure is unintentional, then in step 108 a warning is implemented optically, acoustically, and/or haptically, or a lane-holding reaction is executed, for example activation of an actuating element in order to influence the steering.

The fundamental procedure for classification proceeds from evaluation of at least two operating variables of the vehicle, on the basis of which conclusions can be drawn as to the vehicle's behavior. Operating variables suitable for this are, for example, the steering angle; the vehicle's speed, or its acceleration or deceleration; the lateral offset between the vehicle track and the edge of the lane, in particular changes therein; and/or the angle between the vehicle track and the road edge. With regard to the steering angle, a check is made of the steering behavior, which is clearly detectable in the context of an intention to change lanes. A steering angle greater than a predetermined value, in particular a corresponding change over time in the steering angle, indicates an intention to change lanes. In a curve, the identified road curvature must be taken into account here. In addition, an intention to change lanes (in particular to the left) is usually accompanied by an acceleration of the vehicle, so that in the presence of a vehicle acceleration or driver's acceleration request greater than a defined threshold, an intention to change lanes may be inferred. Another suitable variable is the lateral spacing of the vehicle from the lane marking, especially its change over time. The latter represents an indicator of the rate at which a vehicle is approaching the lane edge marking. This indicator is considerably greater in the context of a deliberate lane change than for an unintended one. The same applies to the angle with respect to the lane marking, which is much greater for a deliberate than for an unintended lane change.

In summary, it is evident that a classification of the lane change operation into deliberate and unintended lane changes is made on the basis of operating variables of the vehicle, in particular when the steering angle exceeds a threshold value and/or the driver's acceleration request exceeds a threshold value, and/or the change over time in the lateral spacing from the edge marking exceeds a threshold value, and/or the angle with respect to the edge marking exceeds a threshold value. These criteria are utilized in weighted fashion to classify the lane change operation as an intentional or unintentional lane change; in general, an intentional lane change can be recognized in the presence of at least one of the above-described situations, and an unintentional one in their absence.

It has been found that a lane change to the left and a lane change to the right must be evaluated using different criteria, since the lane change to the left is usually associated with a passing operation and the vehicle is accelerated. The steering behavior is also greatly amplified in this case of a deliberate lane change, and the angle with respect to the lane marking is very large. The weighting of these criteria in the context of a lane change to the right must be correspondingly modified, in particular decreased, as compared with a lane change to the left.

In a preferred exemplifying embodiment, neural networks are suitable for implementing the classifier in accordance with the procedure presented above. In a preferred exemplifying embodiment, an MLP (multi-layer perceptron) network has proven suitable. The aforementioned variables for the left and the right side are delivered to this neural network. In accordance with the weights (threshold values) associated with the individual neurons, the neural network creates an output variable that indicates a deliberate or an unintended lane change.

A second possible implementation involves stipulating concrete conditions for the individual variables, from whose existence a deliberate or an unintended lane change action is deduced; at least in unclear cases, a combination of the criteria must be utilized in order to confirm the decision. For example, if the angle of the vehicle track upon touching the lane is greater than 4°, inattention by the driver can be ruled out if no substantial lane curvature is present. A corresponding decision rule can be created correspondingly for each variable that is used. For the remaining situations that do not yield an unequivocal result based on any decision rule, a clear decision is made on the basis of a remaining feature (e.g. the change over time in the spacing from the lane boundary) as to whether a deliberate or unintended lane change is present. The decision criteria, or at least their weighting, are generally different for the left and the right side.

Figure 3:
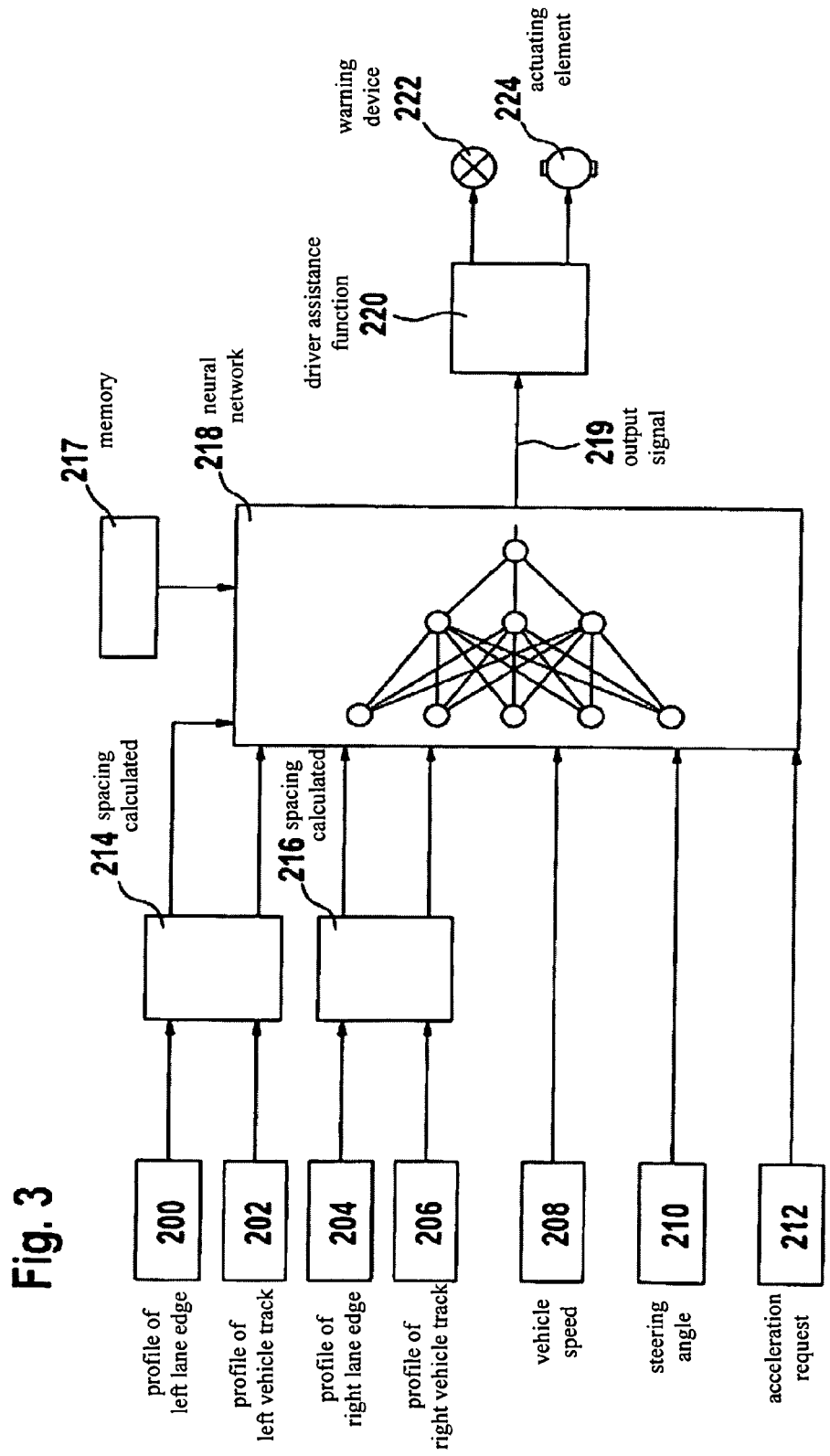
FIG. 3 is a sequence diagram for a first exemplifying embodiment for distinguishing an unintentional from an intentional lane change.

FIG. 3 depicts, with reference to a sequence diagram, the first exemplifying embodiment outlined above. The individual blocks represent corresponding programs or program parts, while the connecting lines depict the signal flow.

In the exemplifying embodiment depicted in FIG. 3, the profile of the left lane edge 200, the profile of the left vehicle track 202, the profile of the right edge marking 204, the profile of the right vehicle track 206, the vehicle speed 208, the steering angle 210, and the driver's acceleration request 212 are inputted. In 214 and 216, the spacing between the vehicle and the lane edge (offset) and the angle between the vehicle track and the lane edge are calculated from the vehicle track edge profile and lane profile, separately for the left and right side in each case. Earlier values for the variables, e.g. variables for 10 time units ago, 30 time units ago, etc., are stored in a memory 217. The aforesaid variables are delivered to a neural network 218. Output signal 219 of the neural network is a datum as to whether an intentional lane change or an unintentional lane change is present. This datum goes to driver assistance function 220 (in the preferred exemplifying embodiment, to the lane departure warning system), which actuates a warning device 222 and/or activates an actuating element 224, in the manner described initially, in the event of an unintentional departure from the lane.

In another advantageous embodiment, output signal 219 is not 0 or 1, but instead assumes a value in the unit interval [0,1]. This is an additionally helpful piece of information for classification. A "definitely" recognized lane change will have, for example, an output value close to 1, for example 0.99998 or 0.95887 (or even 1.0), or the like; correspondingly, a "definitely" recognized instance of inattention will have a value close to 0. A lane change for which the decision is not definitely made will exhibit, in the output of the neural network, a value not close to 0 or to 1, but instead approximately 0.771 or 0.334 or even 0.501. The classification decision can then be unequivocally evaluated ("defuzzification") using a threshold, e.g. with a decision of ">?0.5." This threshold can, however, be adjusted adaptively to the driver. If the threshold selected is, for example, ">0.9," then the lane departure warning system will warn more often, since a warning will occur in an uncertain case. A sporty driver who would like to have fewer warnings can select ">0.2" as the threshold, but must then accept the absence of a warning even in the event of inattention. The network threshold will be set depending on the results of an acceptance study regarding the number of permissible false alarms per hour. It would also be possible to make this threshold adjustable in the final product, by the driver or another person, by way of a "thumbwheel."

In the preferred exemplifying embodiment, the neural network is a multi-layer perceptron whose structure is indicated in FIG. 3. The weights (threshold values for evaluation of the input variables) of the individual neurons are determined in the context of a training operation. This training is based on the results of series of experiments in which the behavior of the respective evaluated operating variables is recorded along with the actual driver behavior (intentional vs. unintentional lane change). Using a learning algorithm (back-propagation for pattern-based MLP training), the weights of the neurons are optimized so as yield the greatest possible success in classifying the experimental data.

In another exemplifying embodiment, a neural network is not used for classification, but instead rigid criteria are defined for the respective operating variables to be evaluated. These criteria (preferably linear separating lines) are likewise defined on the basis of the aforementioned experimental results. The flow charts of FIGS. 4 and 5 show a program with which classification is performed on the basis of such criteria for the left side (FIG. 4) and right side (FIG. 5) of the vehicle. The concrete criteria here can represent comprehensive functions, are defined empirically, and are different for the left and the right side for one or more criteria.

FIG. 4 outlines, as a flow chart, a program that makes possible, on the left side of the vehicle, a distinction between an intentional and unintentional lane change. In the first step 300, the operating variables already mentioned above—edge profile on the left side, vehicle track profile on the left side, vehicle speed, vehicle steering angle, and driver acceleration request—are read in. In the next step 302, the angle between the vehicle track and edge marking, the lateral spacing from the edge marking, and the change in the steering angle are determined. Also in this step, earlier values for these variables are read out of the memory, for example values calculated 10 time units and/or 30 time units earlier. In the subsequent step 304, firstly a criterion for spacing from the edge marking is checked. The change in this spacing between the current time and a previous time, and between the current time and an even earlier value, is checked. If the change in spacing from the previous value is increasing as compared with the change in spacing from the even earlier value, it is assumed that the lane change is intentional. A corresponding signal is delivered in step 306. On the other hand, according to step 308 a signal for an unintentional lane change results if the change in spacing from the previous value is decreasing as compared with the change in spacing from the even earlier value. The criterion is defined so as to create a value range for the spacing changes in which no decision can be made. In that case, in step 310, the driver's acceleration request is utilized. If this exceeds a predefined value, then in step 306 an intentional lane change is assumed. If not, then in step 312 the steering angle criterion is examined. According to this, in the event of a large change in steering angle, an intentional lane change can be inferred. If the change in steering angle is therefore greater than a threshold value, step 306 (indication of an intentional lane change) is initiated. If the steering angle criterion in step 312 is not met, an angle/speed criterion is then utilized in step 314. Here the change in the vehicle's speed is weighted with the angle with respect to the lane edge. If the change in speed is greater than a variable dependent on this angle, an intentional lane change is assumed; if the change in speed is less than this value, an unintentional lane change is inferred (step 308). In this fashion, a classification of the lane change operation is performed.

What is important is that only definite case decisions result in indication of the corresponding result, so that initially a "non-decision" is also accepted, and only the last criterion results, in all the remaining cases, in the definitive decision.

It has been found that driver behavior differs for the right side as compared with the left, so that the criteria must be adapted and the sequence in which the criteria are examined must also be modified. FIG. 5 schematically shows a flow chart for classification of the lane change operations on the right side. In steps 400 and 402 the aforementioned variables for the right side of the vehicle are read in or calculated. In step 404, firstly the steering angle criterion is checked. If only a small change in steering angle is present, inattention is then inferred in step 406. If this criterion is not met, the acceleration request criterion is checked in step 407. If this variable exceeds a specific threshold value that indicates a large acceleration request by the driver, an intentional lane change is inferred in step 408. If this criterion is also not met, the angle/speed criterion is then examined in step 410. Here an intentional lane change (step 408) is assumed if the change in speed is greater than a limit value dependent on the angle with respect to the lane edge, whereas an unintentional lane change (step 406) is assumed if the change in speed is less than a limit value dependent on the angle. The limit values are defined in such a way that here as well, a value zone is created in which no decision can be made. If the value falls in this range, then in step 412 the distance to the boundary line is evaluated. If the change in this spacing is greater than a specific value, an intentional lane change (408) is assumed; if it is less than that value, an unintentional change is assumed (406).

As presented above, the aforesaid procedure for lane change classification is used not only in connection with the lane change warning system mentioned initially, but also with other driver assistance systems such as, for example, an adaptive cruise control, a blind-spot detection system, or a lane change assistance system.

In addition, depending on the exemplifying embodiment, one or other of the operating variables for classification, as presented above, are dispensed with. In another exemplifying embodiment, moreover, not only two previous variables but instead several previous variables are utilized for criterion creation.

An alternative to the use of a steering angle variable is the use of a yaw rate, and an alternative to the lateral spacing from the lane marking is the lateral acceleration of the vehicle; both can be sensed by way of corresponding measurement devices.

What is claimed is:

1. A method for assisting a driver of a vehicle, the method comprising:
   classifying a detected lane change operation by the vehicle, on the basis of operating variables, as to whether the lane change is intentional or unintentional; and
   generating an output signal as a function of the classification;
   wherein the output signal generated is at least one of a warning and a lane keeping reaction when the lane change is unintentional, wherein the at least one of the warning and the lane keeping reaction is suppressed when the lane change is intentional,
   wherein the classification of the lane change is based on operating variables of the vehicle which indicate a behavior of the driver, and
   wherein a classification of a lane change to the right is performed using different criteria than a classification of a lane change to the left, including when a turn indicator has not been actuated.

2. The method according to claim 1, wherein one of the operating variables is one of a steering angle and a yaw rate of the vehicle.

3. The method according to claim 1, wherein one of the operating variables is a driver's acceleration request, a variable derived from a deflection of an accelerator pedal.

4. The method according to claim 1, wherein one of the operating variables is a vehicle speed.

5. The method according to claim 1, wherein one of the operating variables is an angle between a vehicle track and a boundary of the lane.

6. The method according to claim 1, wherein one of the operating variables is one of a vehicle spacing from an edge marking of the lane and a vehicle lateral acceleration.

7. The method according to claim 1, wherein the classifying as to whether an intentional or unintentional lane change is present is made with the aid of a classifier that includes a neural network.

8. The method according to claim 1, further comprising generating an output variable by a classifier that assumes values between values for a definitely detected intentional lane change and for a definitely detected unintentional lane change.

9. The method according to claim 8, further comprising comparing the output variable of the classifier with an adjustable threshold value on the basis of which a determination is made as to whether an intentional or unintentional lane change is present.

10. The method according to claim 1, wherein the classifying as to whether an intentional or unintentional lane change is present is made on the basis of a classifier in which the operating variables are subjected to criteria on the basis of which the classification is made.

11. The method according to claim 1, wherein at least one of (a) previous values of and (b) a change over time of at least one of the operating variables are taken into account in determining when the classification of an intentional lane change or an unintentional lane change is performed.

12. The method according to claim 1, wherein the criteria on which the classification of intentional lane change and unintentional lane change are based differs from each other when the lane change is to the right side or the left side.

13. An apparatus for assisting a driver of a vehicle, comprising:
   at least one evaluation unit for generating an output signal when a lane change operation by the vehicle is detected, the evaluation unit including a classifier for distinguishing on the basis of operating variables between an intentional and unintentional lane change, the evaluation unit generating the output signal as a function of a result of a classification;
   wherein the output signal generated is at least one of a warning and a lane keeping reaction when the lane change is unintentional, wherein the at least one of the warning and the lane keeping reaction is suppressed when the lane change is intentional,
   wherein the classification of the lane change is based on operating variables of the vehicle which indicate a behavior of the driver, and
   wherein a classification of a lane change to the right is performed using different criteria than a classification of a lane change to the left, including when a turn indicator has not been actuated.

14. The apparatus according to claim 13, wherein one of the operating variables is one of a steering angle and a yaw rate of the vehicle.

15. The apparatus according to claim 13, wherein one of the operating variables is a driver's acceleration request, a variable derived from a deflection of an accelerator pedal.

16. The apparatus according to claim 13, wherein one of the operating variables is a vehicle speed.

17. The apparatus according to claim 13, wherein one of the operating variables is an angle between a vehicle track and a boundary of the lane.

18. The apparatus according to claim 13, wherein one of the operating variables is one of a vehicle spacing from an edge marking of the lane and a vehicle lateral acceleration.

19. The apparatus according to claim 13, wherein the classifying as to whether an intentional or unintentional lane change is present is made with the aid of the classifier that includes a neural network.

20. The apparatus according to claim 13, wherein an output variable is generated by the classifier that assumes values between values for a definitely detected intentional lane change and for a definitely detected unintentional lane change.

21. The apparatus according to claim 20, wherein the output variable of the classifier is compared with an adjustable threshold value on the basis of which the classification is performed as to whether an intentional or unintentional lane change is present.

22. The apparatus according to claim 13, wherein the classifying as to whether an intentional or unintentional lane change is present is made on the basis of the classifier in which the operating variables are subjected to criteria on the basis of which the classification is made.

23. The apparatus according to claim 13, wherein at least one of (a) previous values of and (b) a change over time of at least one of the operating variables are taken into account the classification of whether there is an intentional lane change or an unintentional lane change.

24. The apparatus according to claim 13, wherein the criteria on which the classification of intentional lane change and unintentional lane change are based differs from each other when the lane change is to the right side or the left side.

* * * * *